US010867501B2

(12) United States Patent
Milbar

(10) Patent No.: US 10,867,501 B2
(45) Date of Patent: Dec. 15, 2020

(54) ACOUSTIC SENSING AND ALERTING

(71) Applicant: Ibiquity Digital Corporation, Columbia, MD (US)

(72) Inventor: Marek Milbar, Huntingdon Valley, PA (US)

(73) Assignee: Ibiquity Digital Corporation, Columbia, MD (US)

( * ) Notice: Subject to any disclaimer, the term of this patent is extended or adjusted under 35 U.S.C. 154(b) by 386 days.

(21) Appl. No.: 16/002,480

(22) Filed: Jun. 7, 2018

(65) Prior Publication Data

US 2018/0357874 A1    Dec. 13, 2018

Related U.S. Application Data

(60) Provisional application No. 62/517,660, filed on Jun. 9, 2017.

(51) Int. Cl.
*G08B 21/02* (2006.01)
*G01S 3/80* (2006.01)
(Continued)

(52) U.S. Cl.
CPC ............... *G08B 21/02* (2013.01); *G01S 3/80* (2013.01); *G01S 3/802* (2013.01); *G01S 11/14* (2013.01);
(Continued)

(58) Field of Classification Search
CPC .......... G08B 21/02; G08B 7/06; G01S 3/802; G01S 3/80; G01S 11/14; G01S 5/18; H04R 3/005
See application file for complete search history.

(56) References Cited

U.S. PATENT DOCUMENTS 4,067,015 A * 1/1978 Mogavero ............... G01S 3/48
   318/560
4,905,315 A * 2/1990 Solari .................... G01S 3/786
   318/480
(Continued)

FOREIGN PATENT DOCUMENTS

WO    2018227062    12/2018

OTHER PUBLICATIONS

"International Application Serial No. PCT US2018 036628, International Search Report dated Aug. 27, 2018", 2 pgs.
(Continued)

*Primary Examiner* — Ian J Lobo
(74) *Attorney, Agent, or Firm* — Schwegman Lundberg & Woessner, P.A.

(57) ABSTRACT

A housing can be wearable by a user. At least one microphone in or on the housing can sense ambient audio and produce at least one time-domain audio signal. The housing can be passive, such that the sensed ambient audio does not include any sound emitted from the housing. A transformation circuit can transform the at least one time-domain audio signal to form at least one frequency-domain audio signal. An identification circuit can identify a spectral feature in the at least one frequency-domain audio signal. A tracking circuit can track a time evolution of the spectral feature. A determination circuit can determine from the tracked time evolution of the spectral feature that the spectral feature corresponds to an object moving toward the housing. An alert circuit can alert the user, in response to the determination circuit determining that the object is moving toward the housing.

20 Claims, 2 Drawing Sheets

(51) Int. Cl.
    *G01S 11/14*     (2006.01)
    *G01S 3/802*     (2006.01)
    *H04R 3/00*     (2006.01)
    *G08B 7/06*     (2006.01)
    *G01S 5/18*     (2006.01)

(52) U.S. Cl.
    CPC ................ *G01S 5/18* (2013.01); *G08B 7/06* (2013.01); *H04R 3/005* (2013.01)

(56) References Cited

U.S. PATENT DOCUMENTS

| | | | |
|---|---|---|---|
| 4,980,871 A * | 12/1990 | Sieber | ................ G01S 3/807 318/648 |
| 2008/0267416 A1 | 10/2008 | Goldstein et al. | |
| 2010/0302033 A1 | 12/2010 | Devenyi | |
| 2013/0188794 A1 | 7/2013 | Kawamata et al. | |
| 2015/0110285 A1 | 4/2015 | Censo et al. | |
| 2017/0021768 A1 | 1/2017 | Jaegal et al. | |

OTHER PUBLICATIONS

"International Application Serial No. PCT US2018 036628, Written Opinion dated Aug. 27, 2018", 7 pgs.
"International Application Serial No. PCT US2018 036628, International Preliminary Report on Patentability dated Dec. 19, 2019", 9 pgs.

* cited by examiner

ACOUSTIC SENSING AND ALERTING

CROSS-REFERENCE TO RELATED APPLICATION

This application claims the benefit of U.S. Provisional Application No. 62/517,660, filed Jun. 9, 2017, which is incorporated herein by reference in its entirety.

FIELD OF THE DISCLOSURE

The present disclosure relates to performing acoustic sensing and, optionally, providing alerts.

BACKGROUND OF THE DISCLOSURE

Moving objects, such as automotive vehicles, can pose hazards to pedestrians, such as children, the elderly, and the visually impaired.

BRIEF DESCRIPTION OF THE DRAWINGS

Corresponding reference characters indicate corresponding parts throughout the several views. Elements in the drawings are not necessarily drawn to scale. The configurations shown in the drawings are merely examples, and should not be construed as limiting the scope of the invention in any manner.

DETAILED DESCRIPTION

Figure 1:
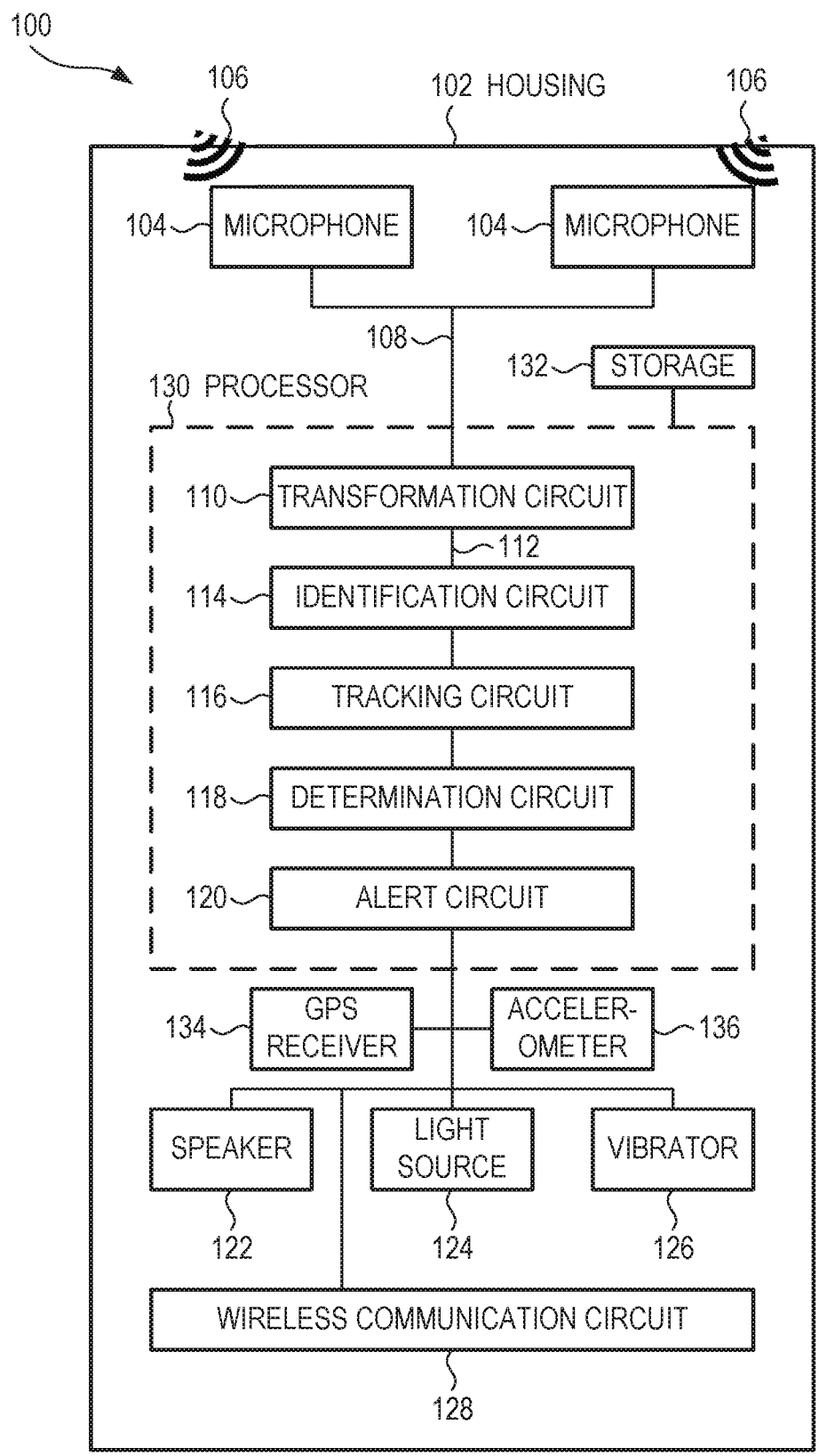
FIG. 1 shows a block diagram of an example of an acoustic sensing and alerting system, in accordance with some embodiments.

To increase the safety of a user, such as a pedestrian, a device can listen to its surroundings, can sense that an object, such as a vehicle, is moving toward the device, and can alert the user that the object is approaching.

For example, a housing can be wearable by a user. At least one microphone in or on the housing can sense ambient audio and produce at least one time-domain audio signal. The housing can be passive, such that the sensed ambient audio does not include any sound emitted from the housing, or any sound emitted by the housing may not be included in the at least one time-domain audio signal. A transformation circuit can transform the at least one time-domain audio signal to form at least one frequency-domain audio signal. An identification circuit can identify a spectral feature in the at least one frequency-domain audio signal. A tracking circuit can track a time evolution of the spectral feature. A determination circuit can determine from the tracked time evolution of the spectral feature that the spectral feature corresponds to an object moving toward the housing. An alert circuit can alert the user, in response to the determination circuit determining that the object is moving toward the housing. In some examples, the alert circuit can alert the user by emitting from the housing at least one of a sound, a light, or a vibration, or by wirelessly communicating an alert to at least one electronic device.

The frequency-based analysis discussed herein is relatively insensitive to orientation of the microphone or microphones. For example, when using the frequency-based analysis with wearable microphones, which may change orientation rapidly, the frequency-based analysis may produce robust results, regardless of microphone orientation or how rapidly each microphone moves. Compared to devices that can sense an approaching object based on time-domain analysis (e.g., merely listening for a sound to grow louder over time), this poses a significant advantage, because microphone movement can significantly impair the time-domain analysis.

In this document, the term audio is intended to represent sound (e.g., an acoustic wave) that can optionally extend beyond the frequency range of typical human hearing. The frequency range of typical human hearing can extend from 16 Hz to 20 kHz, and can be referred to a sonic range. Frequencies greater than the upper limit of typical human hearing, such as those above 20 kHz, can be referred to as an ultrasonic range. In this document, the terms audio and sound are intended to include both the sonic range and the ultrasonic range. As explained below, performing one or more operations in the ultrasonic range can be beneficial.

In this document, the term circuit is intended to include the device that performs a particular task. Such a device can be included purely in hardware, such as a physical circuit with discrete electrical components, purely in software, such as a processor with memory that includes instructions for performing the task, or a combination of hardware and software.

FIG. 1 shows a block diagram of an example of an acoustic sensing and alerting system 100, in accordance with some embodiments. The system 100 of FIG. 1 can listen to its surroundings, can sense that an object, such as a vehicle, is moving toward the system 100, and can optionally alert the user that the object is approaching. The configuration of FIG. 1 is but one example of an acoustic sensing and alerting system 100; other configurations can also be used.

The system 100 can include a housing 102. In some examples, the housing 102 can be wearable by a user. For example, the housing 102 can be a wearable device, such as a bracelet, a watch, a necklace, a clip-on accessory, an article of clothing, or another suitable wearable device. In some examples, the housing 102 can be in a mountable pouch or in a carried backpack. In some examples, the housing 102 can be formed from a rigid material, such as plastic. In other examples, the housing 102 can be formed from a bendable material, such as fabric.

In some examples, the housing 102 can be passive, rather than active. In other words, the housing 102 may not emit sounds specifically for the purpose of detecting objects, and may not listen for those emitted sounds to return from the environment surrounding the housing 102. Instead, the housing 102 may passively detect ambient sound (e.g., sound that is not produced by the housing 102 or any of the components on or in the housing 102), and perform operations on the detected ambient sound to determine if an object is approaching the housing 102. Details of such operations are discussed below.

At least one microphone 104 in or on the housing 102 can sense ambient audio 106 and produce at least one time-domain audio signal 108. In general, each microphone 104 can produce its own time-domain audio signal 108, which can be processed downstream. In some examples, at least one microphone 104 can operate entirely in the analog domain, so that the corresponding time-domain audio signal 108 is an analog time-varying voltage that corresponds to the sensed ambient audio level. In other examples, at least one microphone 104 can include an analog-to-digital converter, so that the corresponding time-domain audio signal 108 is a digital representation of the sensed ambient audio level.

In some examples, each microphone 104 can be ultrasonic. In other words, each microphone 104 can be responsive at frequencies less than a cutoff frequency, the cutoff frequency being greater than 20 kHz, which is the upper limit for the commonly stated range of human hearing. It will be understood that the term audio can apply to frequencies outside the range of human hearing. Examples of suitable cutoff frequencies can include 40 kHz, 50 kHz, a value between 40 kHz and 50 kHz, inclusive, 100 kHz, a value between 50 kHz and 100 kHz, inclusive, 150 kHz, or a value between 100 kHz and 150 kHz, inclusive. Examples of ultrasonic microphones can include microelectromechanical systems (MEMS) thin-film Teflon electret microphones, monolithic MEM microphones, stretchable microphones, and others. In general, each microphone 104 can be relatively small, with diameters as small as 4 mm and thicknesses as small as 1.5 mm. Other sizes can also be used.

In other examples, each microphone 104 can be sonic. In other words, each microphone 104 can be responsive at frequencies less than a cutoff frequency, the cutoff frequency being less than or equal to 20 kHz.

A transformation circuit 110 can transform the at least one time-domain audio signal 108 to form at least one frequency-domain audio signal 112. In some examples, the transform can be a modified discrete cosine transformation. Other suitable transforms can be used, such as Discrete Short-Time Fourier Transform, and others. When an ultrasonic microphone 104 is used, the at least one frequency-domain audio signal 112 can include information between 20 kHz and the cutoff frequency of the microphone 104.

An identification circuit 114 can identify a spectral feature in the at least one frequency-domain audio signal 112. Spectral features can correspond to sounds produced by a moving object, such as a frequency of a car engine, a frequency of a siren, a frequency distribution of road noise, or another suitable feature present in the frequency-domain audio signal 112.

When an ultrasonic microphone 104 is used, the spectral feature can include a first frequency component having a frequency value between 20 kHz and the cutoff frequency of the microphone 104.

A tracking circuit 116 can track a time evolution of the spectral feature, such as by analyzing a sequence of sound samples, where the sequence can include a window of samples that evolves over time. In some examples, the tracking circuit 116 can look for a persistency of frequency, to show that the spectral feature corresponds to a real object, and is not a transient artifact. In some examples, the spectral feature can include a frequency component that increases in magnitude over time, relative to other frequencies in the frequency-domain audio signal 112. Such frequencies can have magnitudes that rise and fall, together, with magnitude changes caused by microphone movement or other effects. When the frequency component rises in magnitude over time, compared to the other frequencies, the frequency component can correspond to a real object approaching the housing 102 or approaching the at least one microphone 104. In some examples, the spectral feature can include a frequency component that is absent before a first time and is present after the first time.

In some examples, the frequency component can have a frequency value that increases over a time interval, remains constant over the time interval, or decreases over the time interval by less than a specified threshold. For these examples, the frequency value can include Doppler effects related to motion of an object relative to the microphone or microphones 104. For example, an increasing frequency can correspond to an object accelerating toward the microphone or microphones 104. A constant frequency can correspond to an object moving with constant velocity toward or away from the microphone or microphones 104. (Note that the constant frequency can also correspond to an unlikely scenario of an object increasing in velocity while moving past the microphone or microphones, where the increasing velocity can counteract the Doppler effects of the motion.) A decreasing frequency can correspond to an object moving past the microphone or microphones 104, with the rate at which the frequency decreases corresponding to how close the object is to the microphone or microphones 104. As a specific example, a first constant frequency at a first time interval, followed by a second constant frequency in a second time interval, can correspond to an object moving with constant velocity toward or away from the microphone or microphones 104, where the first and second constant frequencies are slightly different from one another.

A determination circuit 118 can determine from the tracked time evolution of the spectral feature that the spectral feature corresponds to an object moving toward the housing 102. For example, the determination circuit 118 can determine at least one of an estimated speed or an estimated direction of the object from the tracked time evolution of the spectral feature. The determination circuit 118 can additionally determine from the determined estimated speed and/or estimated direction whether the object is moving on an estimated trajectory that passes within a specified threshold distance from the housing 102. If the estimated trajectory passes within the threshold distance from the housing 102, the determination circuit 118 can cause an alert to trigger downstream.

An alert circuit 120 can alert the user, in response to the determination circuit 118 determining that the object is moving toward the housing 102. In some examples, the alert circuit 120 can emit from the housing 102 an alert including one or more of an audio alert, a visual alert, or a tactile alert, in response to the determination circuit 118 determining that the object is moving on the estimated trajectory that passes within the threshold distance from the housing 102. The audio alert can emit from a speaker 122 on or in the housing 102. The visual alert can emit from a light source 124 on or in the housing 102. The tactile alert can emit from a vibrator 126 on or in the housing 102. In some examples, the alert circuit 120 can further emit from the housing 102 a second alert including one or more of a second audio alert, a second visual alert, or a second tactile alert, in response to the determination circuit 118 determining that the object is moving on the estimated trajectory that passes within a second threshold distance from the housing 102.

In addition to, or instead of, the audio, visual, or tactile alerts, in some examples, the alert circuit 120 can wirelessly communicate an alert to at least one electronic device proximate the housing 102, through a wireless communication circuit 128, in response to the determination circuit 118 determining that the object is moving on the estimated trajectory that passes within the threshold distance from the housing 102. For example, the alert circuit 120 can use a mesh approach, via smart phone or Zigbee, which can notify adjacent electronic devices and smart phones. In some examples, a child can wear the system 100, and the alert circuit 120 can send an alert to a smart phone belonging to a parent of the child, in response to the determination circuit 118 determining that an object is moving toward the microphones 104. In some of these examples, the alert circuit 120 can send the alert to the parent's smart phone directly or indirectly. For example, the alert can be first sent to a smart phone belonging to the child, or to another intermediate device, and then afterward sent to the parent's smart phone.

A specific example of a determination circuit 118 can involve vector analysis. For example, the determination circuit 118 can calculate a wearer's proximity zone. Such a proximity zone can include a general area, and/or can include an estimated motion vector if the system 100 additionally includes motion sensors, such as a global positioning system (GPS) receiver 134 or an accelerometer 136. The determination circuit 118 can build an approximation of a threat, such as a threat vector or a vehicle vector. In the threat approximation, the determination circuit 118 can estimate an initial situation and motion parameters. The determination circuit 118 can expand identification, by processing within the system 100 or stamp, if the system 100 is connected to a processor outside the system 100. The determination circuit 118 can determine a potential for collision between the wearer and the threat. In some examples, the determination circuit 118 can calculate a probability for an overlap zone between the wearer's proximity zone and the threat vector. In some examples, the determination circuit 118 can trigger an action if the calculated probability exceeds a specified threshold. In some examples, the determination circuit 118 can trigger an action if the overlap zone lies within the wearer's proximity zone. In some examples, the triggered action can be executed by an alert circuit 120 downstream.

In a specific example of calculating the wearer's proximity zone, a sensor in the system 100 can provide motion information. For example, the system 100 can include a three-dimensional accelerometer, which is commonly found in activity tracking devices. The system 100 can optionally include a global positioning system (GPS) receiver. In some examples, the system 100 can be connected via Bluetooth to a connected smart phone, and can extract GPS data via the smart phone.

The determination circuit 118 can calculate the wearer's probable area over time. There are shortcomings to using purely accelerometer-based motion assessment, which is commonly used in health tracking systems. For example, such motion assessment typically provides limited directional information, and may allow deriving only coarse radials. Using GPS-based motion assessment can additionally provide motion direction and velocity information, and can allow deriving a refined arc. In some example, the default area can establish radials. In some examples, the radials are time-related radials. For example, the radials can correspond to one minute, two minutes, three minutes, four minutes, and five minutes. Other suitable values can also be used. In some examples, the refined area can be reduced to an arc, if the GPS-based metrics (such as a fast update, consistent information, and so forth) are above 95%.

In some examples, the transformation circuit 110, the identification circuit 114, the tracking circuit 116, the determination circuit 118, and the alert circuit 120 can be integrated within a single chip positioned in or on the housing 102. In some examples, a processor 130 can include the transformation circuit 110, the identification circuit 114, the tracking circuit 116, the determination circuit 118, and, optionally, the alert circuit 120. In some examples, the processor 130 can execute instructions stored in storage 132, where the instructions can implement blocks that correspond to circuits 110 through 120.

In a specific example, the processor 130 can build an approximation of a threat (e.g., an approaching object). In this example, the processor 130 can include the transformation circuit 110, the identification circuit 114, the tracking circuit 116, and the determination circuit 118. A microphone array can sense ambient sounds. The array can include one or more microphones. The processor 130 can determine if the sensed ambient sounds represents a potential threat. In this example, a potential threat can include any massive, motion-capable body. In this example, the processor 130 can search through pre-loaded signatures to match a sound. In some examples, the processor 130 can search through pre-defined characteristics to match a sound. In some examples, a Bluetooth-connected device can provide additional signatures to the processor 130. In this example, the processor 130 can calculate the threat's vector. In some example, an initial calculation can be based on rough triangulation. A small pre-defined catalog can provide refined parameters. An expanded catalog stored in a Bluetooth-connected smart phone can provide further refined parameters.

In some examples, information from the microphone or microphones 104 can be wirelessly communicated to a connected device, such as a smart phone or a computing device separate from the housing. The connected device can optionally include one or more of the circuits 110 through 120, and can optionally perform any or all of the tasks performed by the circuits 110 through 120. In some examples, the connected device can be a remote computing facility, which can trigger the alert, and can optionally perform statistical analysis. In some examples, the connected device can be a vehicle-to-infrastructure (V2I) road side device, which can relay the information to nearby vehicles. In some of these examples, the nearby vehicles can optionally include one or more of the circuits 110 through 120, and can optionally perform any or all of the tasks performed by the circuits 110 through 120. In these examples, each vehicle can determine if it is on a trajectory toward the housing 102, and can therefore determine if it threatens the housing 102.

In some examples, the determination circuit 118 can take an action that does not trigger an alert. For example, determination circuit 118 can optionally convey threat information, such as location and motion details, to a vehicle-to-infrastructure (V2I) road side device, which in turn can distribute the threat information to nearby vehicles.

In some examples, the alert circuit 120 can take an action that does not necessarily include an alert. For example, for a system that can be placed in a forest, the action can include triggering a camera coupled to the system. Other non-alert actions can also be used.

Figure 2:
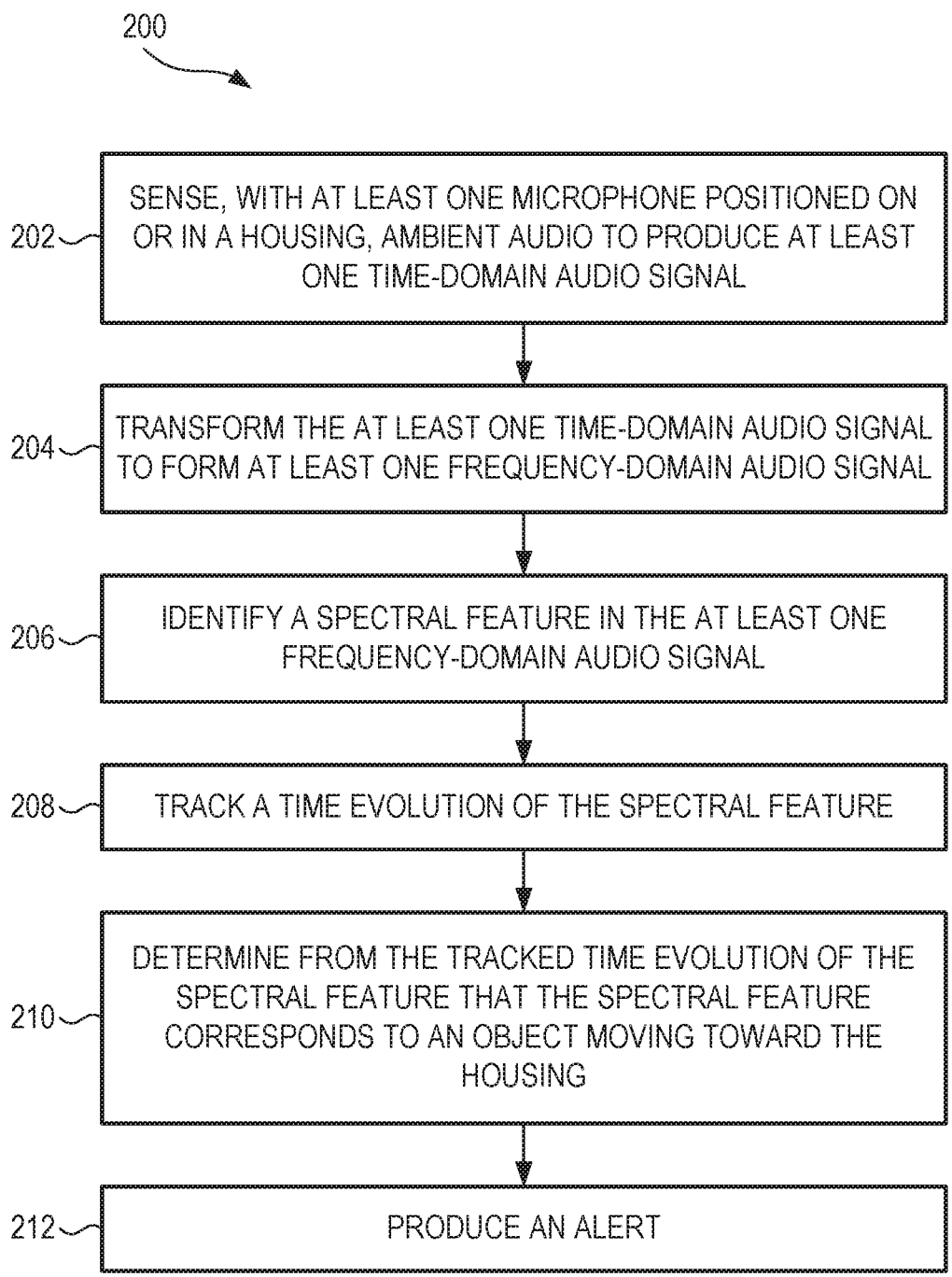
FIG. 2 shows a flowchart of an example of a method for performing acoustic sensing and alerting, in accordance with some embodiments.

FIG. 2 shows a flowchart of an example of a method 200 for performing acoustic sensing and alerting, in accordance with some embodiments. The method 200 can be executed by the system 100 of FIG. 1, or by any other suitable system. The method 200 is but one method for performing acoustic sensing and alerting other suitable methods can also be used.

At operation 202, the hardware processor may be configured according to instructions that, when executed, sense ambient audio, with at least one microphone positioned on or in a housing, to produce at least one time-domain audio signal.

At operation 204, the processor may be configured according to instructions that, when executed, transforms the at least one time-domain audio signal, with a transformation circuit, to form at least one frequency-domain audio signal.

At operation 206, the processor may be configured according to instructions that, when executed, identifies a spectral feature in the at least one frequency-domain audio signal, with an identification circuit.

At operation 208, the processor may be configured according to instructions that, when executed, tracks a time evolution of the spectral feature.

At operation 210, the processor may be configured according to instructions that, when executed, determines, from the tracked time evolution of the spectral feature that the spectral feature corresponds to an object moving toward the housing.

In some examples, the method 200 can optionally further include emitting from the housing, with an alert circuit, an alert including one or more of an audio alert, a visual alert, or a tactile alert, in response to the determination circuit determining that the object is moving toward the housing.

In some examples, the method 200 can optionally further include wirelessly communicating an alert, with an alert circuit, to at least one electronic device proximate the housing, in response to the determination circuit determining that the object is moving toward the housing.

Other variations than those described herein will be apparent from this document. For example, depending on the embodiment, certain acts, events, or functions of any of the methods and algorithms described herein can be performed in a different sequence, can be added, merged, or left out altogether (such that not all described acts or events are necessary for the practice of the methods and algorithms). Moreover, in certain embodiments, acts or events can be performed concurrently, such as through multi-threaded processing, interrupt processing, or multiple processors or processor cores or on other parallel architectures, rather than sequentially. In addition, different tasks or processes can be performed by different machines and computing systems that can function together.

The various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The various illustrative logical blocks and modules described in connection with the embodiments disclosed herein can be implemented or performed by a machine, such as a general purpose processor, a processing device, a computing device having one or more processing devices, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor and processing device can be a microprocessor, but in the alternative, the processor can be a controller, microcontroller, or state machine, combinations of the same, or the like. A processor can also be implemented as a combination of computing devices, such as a combination of a DSP and a microprocessor, a plurality of microprocessors, one or more microprocessors in conjunction with a DSP core, or any other such configuration.

Embodiments of the system and method described herein are operational within numerous types of general purpose or special purpose computing system environments or configurations. In general, a computing environment can include any type of computer system, including, but not limited to, a computer system based on one or more microprocessors, a mainframe computer, a digital signal processor, a portable computing device, a personal organizer, a device controller, a computational engine within an appliance, a mobile phone, a desktop computer, a mobile computer, a tablet computer, a smartphone, and appliances with an embedded computer, to name a few.

Such computing devices can typically be found in devices having at least some minimum computational capability, including, but not limited to, personal computers, server computers, hand-held computing devices, laptop or mobile computers, communications devices such as cell phones and PDAs, multiprocessor systems, microprocessor-based systems, set top boxes, programmable consumer electronics, network PCs, minicomputers, mainframe computers, audio or video media players, and so forth. In some embodiments the computing devices will include one or more processors. Each processor may be a specialized microprocessor, such as a digital signal processor (DSP), a very long instruction word (VLIW), or other microcontroller, or can be conventional central processing units (CPUs) having one or more processing cores, including specialized graphics processing unit (GPU)-based cores in a multi-core CPU.

The process actions of a method, process, or algorithm described in connection with the embodiments disclosed herein can be embodied directly in hardware, in a software module executed by a processor, or in any combination of the two. The software module can be contained in computer-readable media that can be accessed by a computing device. The computer-readable media includes both volatile and nonvolatile media that is either removable, non-removable, or some combination thereof. The computer-readable media is used to store information such as computer-readable or computer-executable instructions, data structures, program modules, or other data. By way of example, and not limitation, computer readable media may comprise computer storage media and communication media.

Computer storage media includes, but is not limited to, computer or machine readable media or storage devices such as Blu-ray discs (BD), digital versatile discs (DVDs), compact discs (CDs), floppy disks, tape drives, hard drives, optical drives, solid state memory devices, RAM memory, ROM memory, EPROM memory, EEPROM memory, flash memory or other memory technology, magnetic cassettes, magnetic tapes, magnetic disk storage, or other magnetic storage devices, or any other device which can be used to store the desired information and which can be accessed by one or more computing devices.

A software module can reside in the RAM memory, flash memory, ROM memory, EPROM memory, EEPROM memory, registers, hard disk, a removable disk, a CDROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an application specific integrated circuit (ASIC). The ASIC can reside in a user terminal. Alternatively, the processor and the storage medium can reside as discrete components in a user terminal.

The phrase "non-transitory" as used in this document means "enduring or longlived". The phrase "non-transitory computer-readable media" includes any and all computer-readable media, with the sole exception of a transitory, propagating signal. This includes, by way of example and not limitation, non-transitory computer-readable media such as register memory, processor cache and random-access memory (RAM).

The phrase "audio signal" is a signal that is representative of a physical sound.

Retention of information such as computer-readable or computer-executable instructions, data structures, program modules, and so forth, can also be accomplished by using a variety of the communication media to encode one or more modulated data signals, electromagnetic waves (such as carrier waves), or other transport mechanisms or communications protocols, and includes any wired or wireless information delivery mechanism. In general, these communication media refer to a signal that has one or more of its characteristics set or changed in such a manner as to encode information or instructions in the signal. For example, communication media includes wired media such as a wired network or direct-wired connection carrying one or more modulated data signals, and wireless media such as acoustic, radio frequency (RF), infrared, laser, and other wireless media for transmitting, receiving, or both, one or more modulated data signals or electromagnetic waves. Combinations of the any of the above should also be included within the scope of communication media.

Further, one or any combination of software, programs, computer program products that embody some or all of the various embodiments of the encoding and decoding system and method described herein, or portions thereof, may be stored, received, transmitted, or read from any desired combination of computer or machine-readable/media or storage devices and communication media in the form of computer executable instructions or other data structures.

Embodiments of the system and method described herein may be further described in the general context of computer-executable instructions, such as program modules, being executed by a computing device. Generally, program modules include routines, programs, objects, components, data structures, and so forth, which perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the scope of the disclosure. As will be recognized, certain embodiments of the inventions described herein can be embodied within a form that does not provide all of the features and benefits set forth herein, as some features can be used or practiced separately from others.

Moreover, although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims.

To further illustrate the device and related method disclosed herein, a non-limiting list of examples is provided below. Each of the following non-limiting examples can stand on its own, or can be combined in any permutation or combination with any one or more of the other examples.

In Example 1, a system can include: at least one microphone to sense ambient audio and produce at least one time-domain audio signal; a transformation circuit to transform the at least one time-domain audio signal to form at least one frequency-domain audio signal; an identification circuit to identify a spectral feature in the at least one frequency-domain audio signal; a tracking circuit to track a time evolution of the spectral feature; and a determination circuit to determine from the tracked time evolution of the spectral feature that the spectral feature corresponds to an object moving toward the at least one microphone.

In Example 2, the system of Example 1 can optionally further include a housing, wherein the at least one microphone is positioned in or on the housing.

In Example 3, the system of any one of Examples 1-2 can optionally be configured such that the determination circuit is further to: determine an estimated speed and an estimated direction of the object from the tracked time evolution of the spectral feature; and determine from the estimated speed and the estimated direction that the object is moving on an estimated trajectory that passes within a threshold distance from the housing.

In Example 4, the system of any one of Examples 1-3 can optionally further include an alert circuit to emit from the housing an alert including one or more of an audio alert, a visual alert, or a tactile alert, in response to the determination circuit determining that the object is moving on the estimated trajectory that passes within the threshold distance from the housing.

In Example 5, the system of any one of Examples 1-4 can optionally be configured such that the alert circuit is further to emit from the housing a second alert including one or more of a second audio alert, a second visual alert, or a second tactile alert, in response to the determination circuit determining that the object is moving on the estimated trajectory that passes within a second threshold distance from the housing.

In Example 6, the system of any one of Examples 1-5 can optionally be configured such that the alert circuit is further to wirelessly communicate an alert to at least one electronic device proximate the housing, in response to the determination circuit determining that the object is moving on the estimated trajectory that passes within the threshold distance from the housing.

In Example 7, the system of any one of Examples 1-6 can optionally be configured such that the transformation circuit, the identification circuit, the tracking circuit, the determination circuit, and the alert circuit are positioned in or on the housing.

In Example 8, the system of any one of Examples 1-7 can optionally be configured such that the transformation circuit, the identification circuit, the tracking circuit, the determination circuit, and the alert circuit are integrated within a single chip positioned in or on the housing.

In Example 9, the system of any one of Examples 1-8 can optionally be configured such that the housing is configured as a wearable device, the wearable device being one of a bracelet, a watch, a necklace, a clip-on accessory, or an article of clothing.

In Example 10, the system of any one of Examples 1-9 can optionally be configured such that the housing is passive, such that the sensed ambient sound excludes sound emitted from the housing.

In Example 11, the system of any one of Examples 1-10 can optionally be configured such that the spectral feature includes a first frequency component that increases in magnitude over time, relative to other frequencies in the frequency-domain audio signal.

In Example 12, the system of any one of Examples 1-11 can optionally be configured such that the first frequency component has a frequency value that increases over a time interval, remains constant over the time interval, or decreases over the time interval by less than a specified threshold.

In Example 13, the system of any one of Examples 1-12 can optionally be configured such that the spectral feature includes a first frequency component that is absent before a first time and is present after the first time.

In Example 14, the system of any one of Examples 1-13 can optionally be configured such that: the at least one microphone is responsive at frequencies less than a cutoff frequency, the cutoff frequency being greater than 20 kHz; the at least one frequency-domain audio signal includes information between 20 kHz and the cutoff frequency; and the spectral feature includes a first frequency component having a frequency value between 20 kHz and the cutoff frequency.

In Example 15, the system of any one of Examples 1-14 can optionally be configured such that: the at least one microphone is responsive at frequencies less than a cutoff frequency, the cutoff frequency being less than or equal to 20 kHz; the at least one frequency-domain audio signal includes information at frequencies less than the cutoff frequency; and the spectral feature includes a first frequency component having a frequency value less than the cutoff frequency.

In Example 16, a method can include: sensing, with at least one microphone positioned on or in a housing, ambient audio to produce at least one time-domain audio signal; transforming, with a transformation circuit, the at least one time-domain audio signal to form at least one frequency-domain audio signal; identifying, with an identification circuit, a spectral feature in the at least one frequency-domain audio signal; tracking, with a tracking circuit, a time evolution of the spectral feature; and determining, with a determination circuit, from the tracked time evolution of the spectral feature that the spectral feature corresponds to an object moving toward the housing.

In Example 17, the method of Example 16 can optionally further include: emitting from the housing, with an alert circuit, an alert including one or more of an audio alert, a visual alert, or a tactile alert, in response to the determination circuit determining that the object is moving toward the housing.

In Example 18, the method of any one of Examples 16-17 can optionally further include: wirelessly communicating an alert, with an alert circuit, to at least one electronic device proximate the housing, in response to the determination circuit determining that the object is moving toward the housing.

In Example 19, a system can include: a housing configured to be wearable by a user; at least one microphone in or on the housing to sense ambient audio and produce at least one time-domain audio signal, wherein the housing is passive, such that any sound emitted by the housing is not included in the at least one time-domain audio signal; a transformation circuit to transform the at least one time-domain audio signal to form at least one frequency-domain audio signal; an identification circuit to identify a spectral feature in the at least one frequency-domain audio signal; a tracking circuit to track a time evolution of the spectral feature; a determination circuit to determine from the tracked time evolution of the spectral feature that the spectral feature corresponds to an object moving toward the housing; and an alert circuit to alert the user, in response to the determination circuit determining that the object is moving toward the housing; wherein the transformation circuit, the identification circuit, the tracking circuit, the determination circuit, and the alert circuit are integrated within a single chip positioned in or on the housing.

In Example 20, the system of Example 19 can optionally be configured such that the alert circuit is further to alert the user by at least one of emitting from the housing a sound, emitting from the housing a light, emitting from the housing a vibration, or wirelessly communicating an alert to at least one electronic device proximate the housing.

What is claimed is:

1. A system, comprising:
    at least one microphone to sense ambient audio and produce at least one time-domain audio signal;
    a transformation circuit to transform the at least one time-domain audio signal to form at least one frequency-domain audio signal;
    an identification circuit to identify a spectral feature in the at least one frequency-domain audio signal;
    a tracking circuit to track a time evolution of the spectral feature; and
    a determination circuit to determine from the tracked time evolution of the spectral feature that the spectral feature corresponds to an object moving toward the at least one microphone.

2. The system of claim 1, further comprising:
    a housing, wherein the at least one microphone is positioned in or on the housing.

3. The system of claim 2, wherein the determination circuit is further to:
    determine an estimated speed and an estimated direction of the object from the tracked time evolution of the spectral feature; and
    determine from the estimated speed and the estimated direction that the object is moving on an estimated trajectory that passes within a threshold distance from the housing.

4. The system of claim 3, further comprising an alert circuit to emit from the housing an alert including one or more of an audio alert, a visual alert, or a tactile alert, in response to the determination circuit determining that the object is moving on the estimated trajectory that passes within the threshold distance from the housing.

5. The system of claim 4, wherein the alert circuit is further configured to emit from the housing a second alert including one or more of a second audio alert, a second visual alert, or a second tactile alert, in response to the determination circuit determining that the object is moving on the estimated trajectory that passes within a second threshold distance from the housing.

6. The system of claim 3, wherein the alert circuit is further configured to wirelessly communicate an alert to at least one electronic device proximate the housing, in response to the determination circuit determining that the object is moving on the estimated trajectory that passes within the threshold distance from the housing.

7. The system of claim 6, wherein the transformation circuit, the identification circuit, the tracking circuit, the determination circuit, and the alert circuit are positioned in or on the housing.

8. The system of claim 7, wherein the transformation circuit, the identification circuit, the tracking circuit, the determination circuit, and the alert circuit are integrated within a single chip positioned in or on the housing.

9. The system of claim 8, wherein the housing is configured as a wearable device, the wearable device being one of a bracelet, a watch, a necklace, a clip-on accessory, or an article of clothing.

10. The system of claim 2, wherein the housing is passive, such that the sensed ambient sound excludes sound emitted from the housing.

11. The system of claim 1, wherein the spectral feature includes a first frequency component that increases in magnitude over time, relative to other frequencies in the frequency-domain audio signal.

12. The system of claim 11, wherein the first frequency component has a frequency value that increases over a time interval, remains constant over the time interval, or decreases over the time interval by less than a specified threshold.

13. The system of claim 1, wherein the spectral feature includes a first frequency component that is absent before a first time and is present after the first time.

14. The system of claim 1, wherein:
the at least one microphone is responsive at frequencies less than a cutoff frequency, the cutoff frequency being greater than 20 kHz;
the at least one frequency-domain audio signal includes information between 20 kHz and the cutoff frequency; and
the spectral feature includes a first frequency component having a frequency value between 20 kHz and the cutoff frequency.

15. The system of claim 1, wherein:
the at least one microphone is responsive at frequencies less than a cutoff frequency, the cutoff frequency being less than or equal to 20 kHz;
the at least one frequency-domain audio signal includes information at frequencies less than the cutoff frequency; and
the spectral feature includes a first frequency component having a frequency value less than the cutoff frequency.

16. A method, comprising:
sensing, with at least one microphone positioned on or in a housing, ambient audio to produce at least one time-domain audio signal;
transforming, with a transformation circuit, the at least one time-domain audio signal to form at least one frequency-domain audio signal;
identifying, with an identification circuit, a spectral feature in the at least one frequency-domain audio signal;
tracking, with a tracking circuit, a time evolution of the spectral feature; and
determining, with a determination circuit, from the tracked time evolution of the spectral feature that the spectral feature corresponds to an object moving toward the housing.

17. The method of claim 16, further comprising:
emitting from the housing, with an alert circuit, an alert including one or more of an audio alert, a visual alert, or a tactile alert, in response to the determination circuit determining that the object is moving toward the housing.

18. The method of claim 16, further comprising:
wirelessly communicating an alert, with an alert circuit, to at least one electronic device proximate the housing, in response to the determination circuit determining that the object is moving toward the housing.

19. A system, comprising:
a housing configured to be wearable by a user;
at least one microphone in or on the housing to sense ambient audio and produce at least one time-domain audio signal, wherein the housing is passive, such that any sound emitted by the housing is not included in the at least one time-domain audio signal;
a transformation circuit to transform the at least one time-domain audio signal to form at least one frequency-domain audio signal;
an identification circuit to identify a spectral feature in the at least one frequency-domain audio signal;
a tracking circuit to track a time evolution of the spectral feature;
a determination circuit to determine from the tracked time evolution of the spectral feature that the spectral feature corresponds to an object moving toward the housing; and
an alert circuit to alert the user, in response to the determination circuit determining that the object is moving toward the housing;
wherein the transformation circuit, the identification circuit, the tracking circuit, the determination circuit, and the alert circuit are integrated within a single chip positioned in or on the housing.

20. The system of claim 19, wherein the alert circuit is further configured to alert the user by at least one of emitting from the housing a sound, emitting from the housing a light, emitting from the housing a vibration, or wirelessly communicating an alert to at least one electronic device proximate the housing.

* * * * *